(12) United States Patent
Amm et al.

(10) Patent No.: US 8,915,596 B2
(45) Date of Patent: Dec. 23, 2014

(54) METHOD AND APPARATUS FOR CONCEALING SENSORS AND OTHER COMPONENTS OF ELECTRONIC DEVICES

(71) Applicant: Apple Inc., Cupertino, CA (US)

(72) Inventors: David Thomas Amm, Morgan Hill, CA (US); James J. Dudley, Sunnyvale, CA (US); Peter Henry Mahowald, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/066,296

(22) Filed: Oct. 29, 2013

(65) Prior Publication Data

US 2014/0055856 A1   Feb. 27, 2014

Related U.S. Application Data

(63) Continuation of application No. 13/071,330, filed on Mar. 24, 2011, now Pat. No. 8,567,955.

(51) Int. Cl.
| | |
|---|---|
| *G03B 21/00* | (2006.01) |
| *G03B 21/14* | (2006.01) |
| *G03B 21/22* | (2006.01) |
| *G03B 21/56* | (2006.01) |
| *H04N 5/64* | (2006.01) |
| *H04N 5/66* | (2006.01) |
| *H04N 5/225* | (2006.01) |
| *H04N 9/31* | (2006.01) |
| *G02B 5/30* | (2006.01) |
| *G02B 27/28* | (2006.01) |
| *G06F 1/16* | (2006.01) |

(52) U.S. Cl.
CPC ............ *G02B 5/3083* (2013.01); *G06F 1/1605* (2013.01); *G06F 1/1647* (2013.01)

USPC ............ 353/20; 353/97; 353/122; 348/207.1; 348/841; 359/450; 359/485.01; 359/489.07

(58) Field of Classification Search
USPC ............. 353/20, 71, 97, 122; 348/207.1, 739, 348/744, 836, 840–842; 359/443, 447–448, 359/450, 483.01, 484.01, 484.05, 359/485.01–485.05, 489.01, 489.07
See application file for complete search history.

(56) References Cited

U.S. PATENT DOCUMENTS

| | | | |
|---|---|---|---|
| 5,486,840 A | | 1/1996 | Borrego et al. |
| 5,768,163 A | * | 6/1998 | Smith, II ................. 708/105 |

(Continued)

FOREIGN PATENT DOCUMENTS

EP    2172830    4/2010

OTHER PUBLICATIONS

International Search Report and Written Opinion dated Jun. 29, 2012, PCT/US2012/030357, 8 pages.

(Continued)

*Primary Examiner* — Tony Ko
*Assistant Examiner* — Jori S Reilly-Diakun
(74) *Attorney, Agent, or Firm* — Brownstein Hyatt Farber Schreck, LLP

(57) ABSTRACT

A concealing structure to at least partially conceal a sensor, light emitter or other component by at least partially preventing reflection of external light by an underlying structure. In some examples, this function is performed by a two-component masking assembly, the masking assembly including a linear polarizer to cause linear polarization of light which passes from the exterior of the device to an underlying component, and a wave plate to shift the axis of any reflected polarized light. In many cases, a high density optical fluid will further be included within the masking assembly to minimize reflections from the other components of the assembly.

20 Claims, 4 Drawing Sheets

(56) References Cited

U.S. PATENT DOCUMENTS

| | | |
|---|---|---|
| 6,812,958 B1 | 11/2004 | Silvester |
| 7,061,536 B2 | 6/2006 | Cha |
| 7,128,951 B2 | 10/2006 | Takeuchi et al. |
| 7,183,948 B2 | 2/2007 | Roberts |
| 7,274,418 B2 | 9/2007 | Gurevich et al. |
| 7,286,181 B2 * | 10/2007 | Cha .............................. 348/373 |
| 7,965,443 B2 | 6/2011 | Martin |
| D669,112 S * | 10/2012 | Gustaveson ................ D16/237 |
| 8,567,955 B2 | 10/2013 | Amm et al. |
| 2007/0115619 A1 | 5/2007 | Wang et al. |
| 2008/0012944 A1 | 1/2008 | Lu et al. |
| 2010/0053409 A1 | 3/2010 | Chang |
| 2011/0124260 A1 | 5/2011 | Zhong |

OTHER PUBLICATIONS

"OSD Displays," [online]. [retrieved on Jul. 24, 2012]. Retrieved from the Internet: <URL: http.//osddisplays.com/display_technology.php>,2012), 3 pgs.

"User:Dave3457/Sandbox/Circular Polarizer," Wikipedia® [online]. [retrieved on Jul 24, 2012]. Retrieved from the Internet: <URL: http://en.wikipedia.org/wiki/User:Dave3457Sanbox/Circular_Polarizer>, (2012), 7 pgs.

* cited by examiner

METHOD AND APPARATUS FOR CONCEALING SENSORS AND OTHER COMPONENTS OF ELECTRONIC DEVICES

CROSS-REFERENCE TO RELATED APPLICATION

This application is a continuation of and claims priority to U.S. patent application Ser. No. 13/071,330, entitled "Method and Apparatus for Concealing Sensors and Other Components of Electronic Devices," filed on Mar. 24, 2011, now U.S. Pat. No. 8,567,955, which is incorporated by reference in its entirety as if fully disclosed herein.

BACKGROUND

The present invention relates generally to methods and apparatus for concealing sensors and other components of electronic devices, and particularly to concealing the presence of sensors and other components that require placement in a location of an electronic device that allows transmission of light in the visible and near-visible spectrums. A few examples of such components include cameras, infrared sensors, ambient light sensors, indicator lights, etc.

Many forms of electronic devices include components (such as sensors and light emitters) requiring the transmission or receiving of light. In many such devices, these components may be mounted adjacent a display. In many cases, a better design could be achieved if the location of these components could be at least partially concealed from view. However, such concealment may be problematic, since the passage of light through any intervening structure or surface is necessary for proper functioning of the optical devices. An example of an existing concealing structure for some types of devices includes a region of micro-perforations formed in a surface. Conventional micro-perforation configurations, however, allow for relatively limited transmission of the available light therethrough, and therefore may not be suitable for all concealment applications; and in some cases may be relatively complex and expensive to produce.

SUMMARY OF THE INVENTION

The present invention provides a concealing structure to at least partially conceal a sensor, light emitter or other component by at least partially preventing reflection of external light by the underlying structure. In some examples, this function is performed by a two-component masking assembly, the masking assembly including a linear polarizer to cause linear polarization of light which passes through it to an underlying component, and a wave plate to shift the axis of any reflected polarized light. In some such systems, the wave plate will be mounted substantially parallel to the linear polarizer such that it is located between the linear polarizer and optical component, to cause at least partial circular polarization of linearly polarized light which passes through the wave plate to the optical component. In some examples, the masking member may be a laminate structure including the two components. In many examples, the component may be mounted in a border area of a device, adjacent a display screen.

The masking member, or mask, may further comprise a translucent cover plate that is spaced from the linear polarizer, and a layer of high optical density fluid held captive between the cover plate and the linear polarizer. The high optical density fluid has a refractive index greater than that of air. Instead, or in addition, the masking member may include an opaque frame member that defines an aperture aligned with a component in the form of optical sensor, to allow the passage of light through the aperture on to the optical sensor. An outer surface of the frame member may have, at least in a region surrounding the aperture, a dark or black appearance.

The mask allows the passage of light on to optical sensors beneath the mask, and it allows the passage of light from optical indicators or other illuminators mounted behind it, but it impedes the passage of light from the outside of the device which has passed through the mask and would otherwise be reflected back outwards.

DETAILED DESCRIPTION

The following detailed description refers to the accompanying drawings that depict various details of examples selected to show how the present invention may be practiced. The discussion addresses various examples of the inventive subject matter at least partially in reference to these drawings, and describes the depicted embodiments in sufficient detail to enable those skilled in the art to practice the invention. Many other embodiments may be utilized for practicing the inventive subject matter other than the illustrative examples discussed herein, and many structural and operational changes in addition to the alternatives specifically discussed herein may be made without departing from the scope of the inventive subject matter. The invention has been described in the context of "electronic devices," which is used to identify any of a wide variety of electrically powered devices, including without limitation: communication devices such as cell phones or land line phones; music and multimedia players; gaming devices; televisions; set top boxes, such as for televisions and other display systems; controllers, such as remote controls for operating other devices and gaming controllers; Personal Digital Assistants (PDAs); and computing devices of all forms (desktops, laptops, servers, tablets, palmtops, workstations, etc.) as well as associated components such as monitors (either separate or as part of an all-in-one systems), external drives, etc.; and many other types of devices in a variety of fields. As will be apparent from the discussion herein, the techniques and structures described herein are applicable to virtually any application where functional or aesthetic benefits can be obtained by obscuring or concealing the presence of components, and especially of light emitting or receiving components, beneath an outer surface.

In this description, references to "one embodiment" or "an embodiment," or to "one example" or "an example" in this description are not intended necessarily to refer to the same embodiment or example; however, neither are such embodiments mutually exclusive, unless so stated or as will be readily apparent to those of ordinary skill in the art having the benefit of this disclosure. Thus, the present invention can include a variety of combinations and/or integrations of the embodiments and examples described herein, as well as further embodiments and examples as defined within the scope of all claims based on this disclosure, as well as all legal equivalents of such claims.

Figure 1:
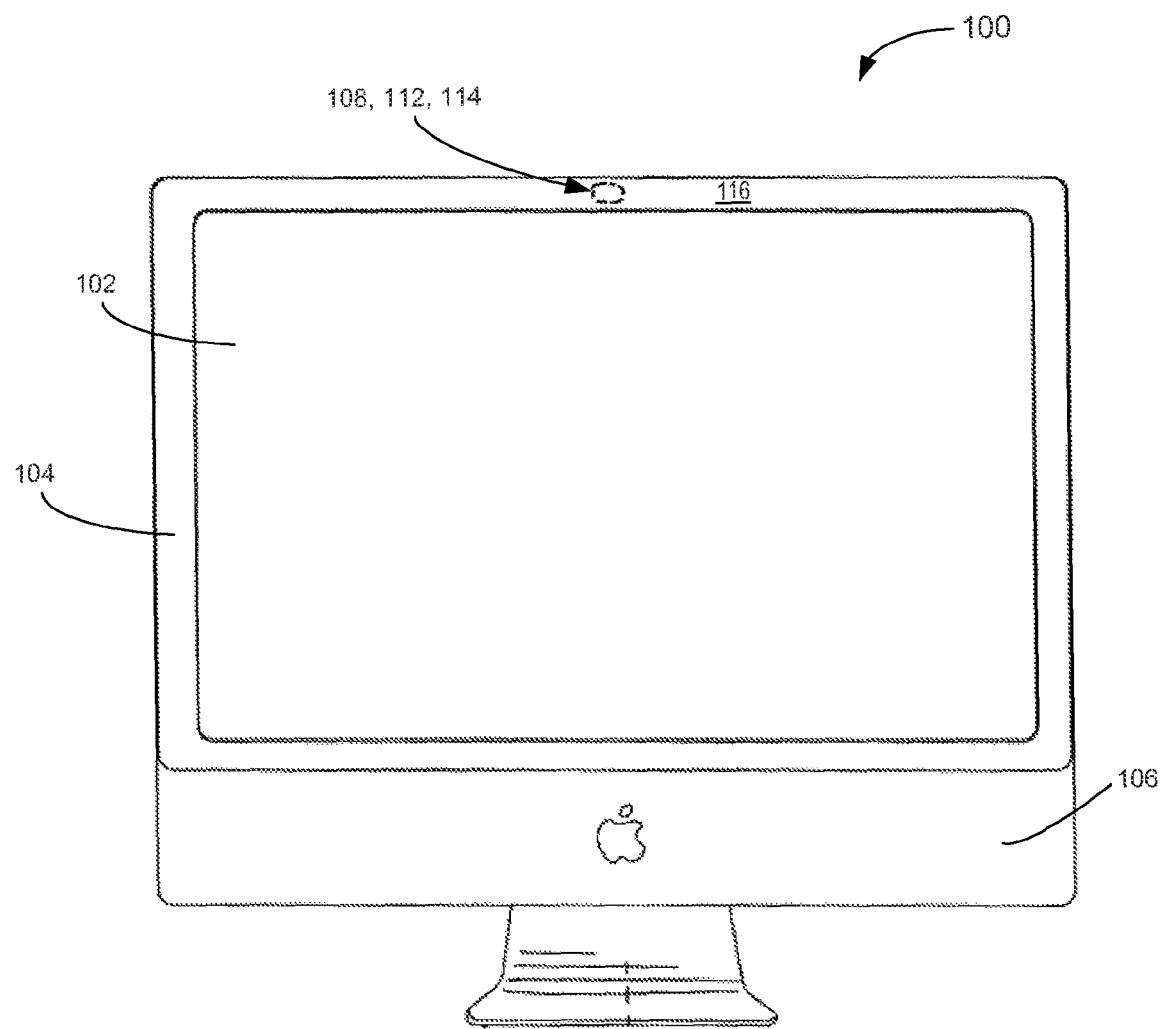
FIG. 1 depicts a front view of a computer monitor according to an example embodiment of a device having masked optical components.

Referring now to FIG. 1, therein is depicted an electronic device in the example form of a computer monitor 100 as one example of many possible configurations that may be used to implement the present invention. The monitor 100 comprises a display area or screen 102 surrounded by a border area or periphery 104. The periphery 104 is defined by a body 106 of the monitor 100, the body 106 may be formed, for example, of a plastic, metal or glass material.

The body 106 the monitor 100 defines a cavity or recess 108 in the periphery 104 to house one or more components such as optical sensors or indicators. For ease and clarity of reference herein, the term "optical component" will be used to identify any component which emits visible light or near-visible light, and/or which receives visible or near-visible light. While the present techniques will often be used primarily with such optical components, due to the need for light transmission for these components, it should be clearly understood that components other than optical components may also be concealed through use of the structures and methods described herein. To avoid doubt, the mechanism that receives or transmits the light can be a structure other than the device that originally emits or uses the light. For example, an light source (such as an LED) could be located at a remote location, but communicate the light through an optical fiber (or light pipe) to the emitting end of the fiber at a desired location for the light, and thus in that example, the optical fiber (or similarly functioning device) is an "optical component" within the scope of the above definition. The terms "optical" and "light" as used herein pertain to electromagnetic radiation both in the visible spectrum and in the infrared spectrum. Thus an "optical sensor" as used herein refers to an optical component that receives light in the visible or near-visible spectrum.

In this example, the monitor has a generally rectangular profile, when viewed face-on, with the recess 108 being located more or less centrally, and in an operatively horizontal upper crossbar or band of the periphery 104. The monitor 100 includes a number of optical components mounted in the recess 108. In this example, an optical sensor in the form of an ambient light sensor (ALS) 112 and an optical indicator provided by an indicator light 114 in the form of a light emitting diode (LED) are positioned in the recess 108 (see also FIG. 2). The ALS 112 serves to sense ambient light conditions, and may be communicatively coupled to display software or electronics of the screen 102, to automatically adjust a display on the screen 102 responsive to changes in ambient light. In other embodiments, a camera aperture and/or lens may be housed in the recess 108 together with the ALS 112 for capturing video or still images of a user facing the monitor 100. Such a camera may automatically adjust properties such as aperture size and/or shutter speed (or other parameters) responsive to feedback from the ALS 112.

The indicator light 114 may be used indicate a particular state or condition of the monitor 100 or associated devices. Thus, for example, the indicator light 114 may automatically be switched on to emit visible light in response to an event or stimulus, or as an indicator of a state of the device: e.g. activation of an associated camera, occurrence of a particular keyboard condition, to indicate an e-mail inbox status, to indicate a battery charge state, etc. The indicator light may include an arrangement of colored LEDs configured to produce a color-differentiated emission depending on the status of an associated device condition.

Figure 2:
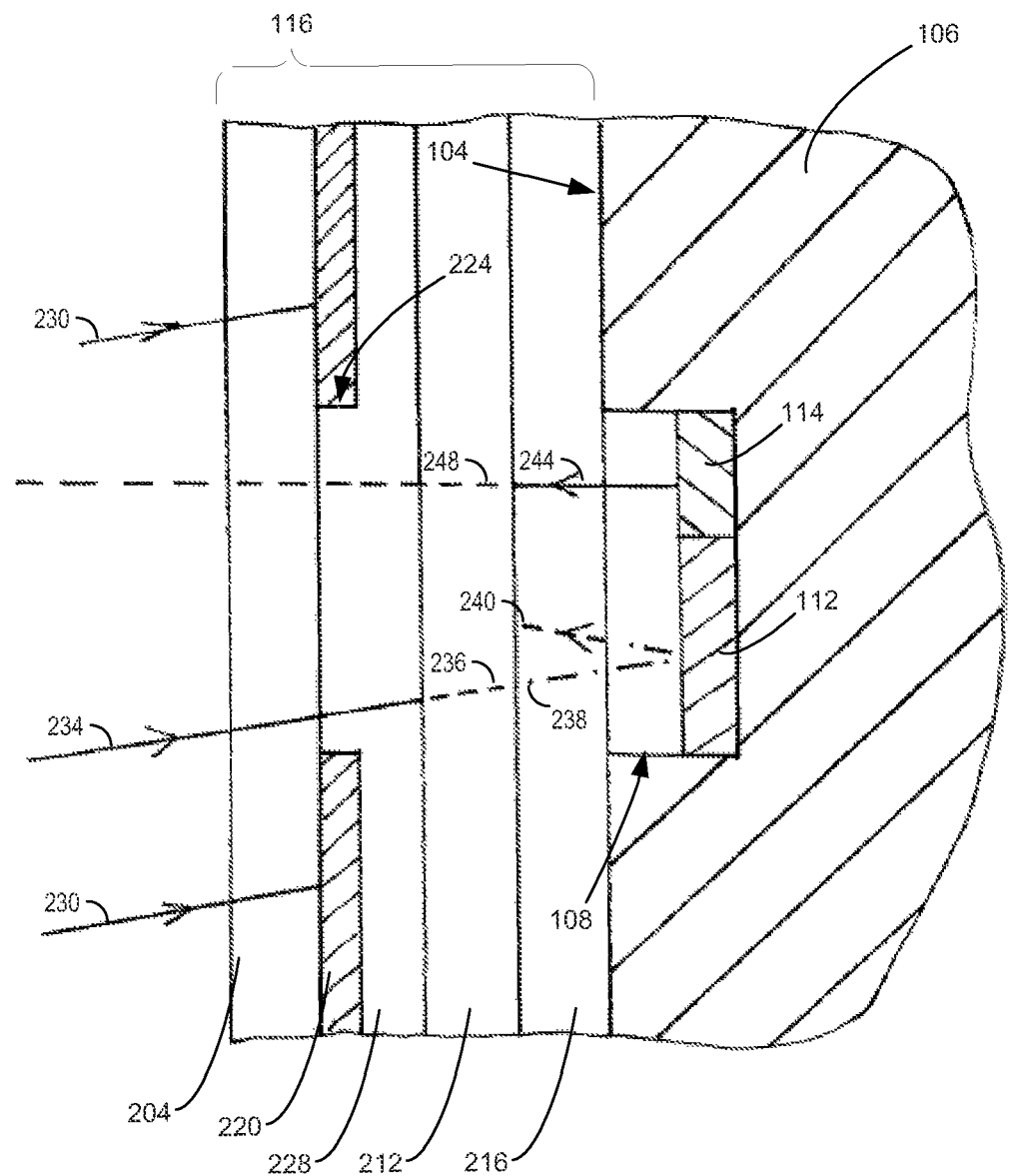
FIG. 2 depicts a partial sectional side view, to an enlarged scale, of the computer monitor of FIG. 1, showing optical components covered by a laminate mask.

The periphery 104 is covered by a laminate assembly ("laminate") 116 which extends continuously around the periphery 104 and extends over a mouth of the recess 108 that faces operatively outwards from the body 106, thus serving as a mask for the optical components in the recess 108. The recess 108 is a blind recess, by which is meant that the mouth of the recess 108 is the only entrance for incident light to the recess 108. An outer surface of the periphery 104 is thus provided by the laminate 116. Laminar components of the laminate 116, according to an example embodiment, can best be seen in FIG. 2, which shows the laminate 116, recess 108, and part of the body 106 in cross-section. For clarity of description, the recess 108 is shown to be somewhat larger than may be the case in practice. In particular, for clarity of illustration, FIG. 2 shows a sizable gap in the recess 108 between the laminate 116 and the optical components mounted in the recess 108, while, in practice, excess space in the recess 108 will often preferably be limited. Additionally, as will be apparent to those skilled in the art, the surfaces defining recess 108, and other non-optical surfaces within the recess (as opposed, for example, to lenses and the like) will be matte black so as to minimize internal light reflections within recess 108. The ALS 112 and the indicator light 114 are likewise illustrated as having flat peripheral outlines in section, but it will be appreciated that at least some of these optical components may have a spheroidal shape. In some embodiments, the optical components, particularly optical indicators such as the indicator light 114, may include a section of light pipe provided between the indicator and the laminate 116, to promote uniform light dispersion.

The laminate 116 includes an operatively outer translucent or transparent cover plate. In the present example, the cover plate is a glass cover 204 of clear glass and has no significant optical effect on light passing through it. In a region of the laminate corresponding to the location of recess 108 containing the described optical components, the laminate 116 further includes a composite circular polarizer assembly 210 located between the body 106 and the glass cover 204. The composite circular polarizer assembly comprises a linear polarizer 212 connected face-to-face with a wave plate 216. The linear polarizer 212 is located on an operatively outer side of the wave plate 216, with the wave plate 216 bearing against the body 106 of the monitor 100 along the periphery 104. Light that, in operation, passes from the outside through the laminate 116 and to the recess 108 thus first traverses the linear polarizer 212 and thereafter passes through the wave plate 216, while the light emitted from the indicator light 114 passes first through the wave plate 216 and then through the linear polarizer 212. The linear polarizer 212 serves to polarize electromagnetic radiation in the visual and infrared spectrum such that an electric field vector or magnetic field vector of the radiation is generally confined to a given line along the direction of propagation. The linear polarizer 212 thus has a specific optical axis.

The wave plate 216 is an optical device that alters the polarization state of electromagnetic wave, typically a light wave, travelling through it by shifting the phase between two perpendicular polarization components of the light wave. The wave plate 216 may be a birefringent crystal with carefully chosen orientation thickness. In the present example, the wave plate 216 is a quarter wave plate that creates a quarter-wavelength phase shift and thus changes linearly polarized light to circularly polarized light, and vice versa. The use of a quarter-wave plate is not the only foreseeable embodiment, as other degrees of phase shifts may be adequate for given applications (such as, for example, a ⅛ wave plate, creating a ⅛-wavelength shift). Additionally, in some embodiments, the laminate 116 may further include a band pass filter to limit light passing therethrough to a particular band of wavelengths in which the wave plate produces optimal performance.

The laminate 116 further includes a frame member in the form of a layer of black ink 220 located between the glass cover 204 and the linear polarizer 212, the layer of ink 220 lying face-to-face with an operatively inner face of the glass cover 204. The layer of ink 220 defines an opening or aperture 224 aligned with the recess 108, to permit the passage of light through the laminate 116 into and out of the recess 108. It will be appreciated that the layer of ink 220 is opaque, obstructing the passage of light through it, and is colored black, to provide a black finish to the periphery 104 of the monitor 100. In some devices, such as, for example, when the features described herein are applied to a mobile telephone, the glass cover 204 may extend over the entirety of the screen 102 and the periphery 104, so that operatively outer surfaces of the screen 102 and periphery 104 are flat and co-planar, while the layer of black ink 220 may be provided only along the periphery 104, to give the periphery 104 a glossy black finish. In embodiments where a matte black finish is required, an operatively outer surface of the glass cover 204 may be roughened or somewhat frosted.

In this example system, the glass cover 204 and the layer of black ink 220 are spaced from the linear polarizer 212 by a layer of high optical density fluid, in this embodiment an index matching fluid 228. The term "high optical density fluid" is used to identify a fluid which has a refractive index greater than that of air, so that the difference between the refractive indices of the index matching fluid 228 and the glass cover 204 is smaller than the difference between the refractive indices of the glass cover 204 and air. The high optical density fluid may thus, for example, have a refractive index within the range of 1.2-1.7, often being within the range of 1.3-1.6. The term "index matching fluid" is used to identify a fluid which is selected to have a refractive index between that of the glass cover 204 and the linear polarizer 212. A desired refractive index for the index matching fluid may, in one embodiment, be calculated by taking the square root of the product of the reflective indices of the glass cover 204 and the linear polarizer 212. The index matching fluid 228 may be a liquid of high viscosity, such as, for example, a resin. In the present example, the index matching fluid 228 is a gel or epoxy with a refractive index of about 1.45, the glass cover having a refractive index of about 1.5 and the linear polarizing having a refractive index of about 1.4. In some examples, the index matching fluid may also have a tint to further assist in matching the appearance of the neighboring region having black ink 220.

The layer of index matching fluid 228 is held captive between the linear polarizer 212 and the layer of ink 220 and the glass cover 204. The index matching fluid 228 completely fills a volume defined by the linear polarizer 212, the layer of ink 220, and the glass cover 204, so that no air pockets are formed in the layer of index matching fluid 228.

The linear polarizer 212 and the wave plate 216 may each be about 0.1 mm thick in many practical embodiments, while the glass cover 204 may be about 0.5 mm thick. The layer of index matching fluid 228 may have a thickness of about 0.05-0.2 mm. The composite laminate 116 may thus have a thickness of about 0.8-1.2 mm, and preferably within the range of 0.6 to 1.0 mm.

In operation, unpolarized ambient light, indicated in FIG. 2 by unbroken arrowed lines 234, passes through the laminate 116 to reach the ALS 112, but after reflecting off components of the recess 108, the reflected light is blocked by the laminate 116, as described in more detail below. In contrast, light emitted by the indicator light 114 passes through the laminate 116 and aperture 224. Unpolarized ambient light that does not pass through the aperture 224, as indicated by arrows 230, is absorbed by the layer of black ink 220 with minimal reflection from the outer surface of the layer of black ink 220, to give the laminate 116 a dark or black appearance. Unpolarized light that passes through the aperture 224 (indicated by arrow 234), however, passes through the glass cover 204 and the layer of index matching fluid 228 without significant optical alteration, and is linearly polarized by the linear polarizer 212. In FIG. 2, linearly polarized light is indicated by dotted lines 236. For ease of illustration, polarization effects of a particular layer are indicated by a change in the status of the associated arrowed line at an entrance plane to the particular layer. Thus, for example, an exemplary beam of light 234 is shown as being linearly polarized at a plane defining the interface between the layer of index matching fluid 228 and the linear polarizer 212. Light 236 which is thus polarized by the linear polarizer 212 has a plane of polarization corresponding to the optical axis of the linear polarizer 212.

The linearly polarized light 236 is thereafter changed to circularly polarized light 238 by the wave plate 216. Circularly polarized light is indicated in FIG. 2 by chain dotted lines at 238. The circularly polarized light 238 thus reaches the ALS 112, permitting the ALS 112 to sense ambient light qualities. It will be appreciated that circular polarization of the ambient light 234, as described above, does not significantly affect the effectiveness of the ALS 112. Although at least the linear polarizer 212 may absorb a portion of the ambient light 234, the laminate 116 may in some embodiments have a transmittance factor of about 50%.

When the circularly polarized light 238 is reflected off components in the recess 108, it will re-enter the wave plate 216. The reflected circularly polarized light 238 is converted by the wave plate 216 to linearly polarized light 240, but the plane of polarization of the newly linearly polarized light 240 is orthogonal (i.e. normal or perpendicular) to the optical plane of the linear polarizer 212. As a result, the linearly polarized light 240 is absorbed or obstructed by the linear polarizer 212. The laminate 116 thus allows passage of light from the indicator light 114 through it, but blocks the passage of light 238 which is reflected from the components of the recess 108. Because the laminate 116 effectively acts as a light trap, so that no light, or only a minimal amount of light, is reflected from the recess 108, the aperture 224 will appear black to a user when the indicator light 114 is off. "Minimal reflected light" in terms of the identified systems indicates that at least 99% of external light reflecting off of surfaces within recess 108 is blocked or absorbed; while many systems should be configurable to provide 99.9% or even greater blocking or absorption. The particular pigment of the layer of ink 220 may be selected to limit visual distinction between the layer of ink 220 and the aperture 224, when the light 114 is dark. Because at least a region of the frame member provided by the layer of ink 220 surrounding the aperture 224 is black, the aperture 224 has a similar appearance to the surrounding layer of black ink 220, and is therefore hidden or masked.

When the indicator light 114 is switched on, it may emit unpolarized light 244 that passes through the wave plate 216 without a change in its polarization state. The light 244 is, however, polarized by the linear polarizer 212, to provide linearly polarized light 248. Such linearly polarized light 248 passes through the aperture 224 and is easily visible to a user.

Provision of the linear polarizer 212 and wave plate 216 combination, together with an aperture in a black background provided by the layer of ink 220, permits optical sensors and/or indicators, such as the ALS 112 and the indicator light 114 to be hidden. Not only are the particular components mounted in the recess not visible, but the presence of any sensors or indicators in the black background of the periphery 104 is not easily detectable by a casual viewer. The arrangement also allows the passage of more light through it than is the case with known methods of obscuring optical sensors and/or indicators. For example, a micro-perforation configuration, which, in many configurations, allows the passage of less than 10% of incident light (the transmission being a function of the perforation size and spacing, and with transmission being in generally adverse relation to the invisibility of the perforations). In contrast, the laminate 116 may in some embodiments allow about 50% of incoming light therethrough. The greater translucency of the laminate 116, as compared to, for example, micro-perforation configurations, provides not only improved performance of optical sensors, such as the ALS 112, but it also allows more light from an optical indicator, such as the indicator light 114, to pass through it. A visual indicator may therefore consume less power in order to provide comparable light intensity to a user. Production of the laminate 116 is furthermore relatively cost effective, in comparison to, for example, micro-perforation configurations. The layered linear polarizer 212 and wave plate 216 may, for example, be made in a roll-to-roll process and may be laminated onto glass.

Figure 3:
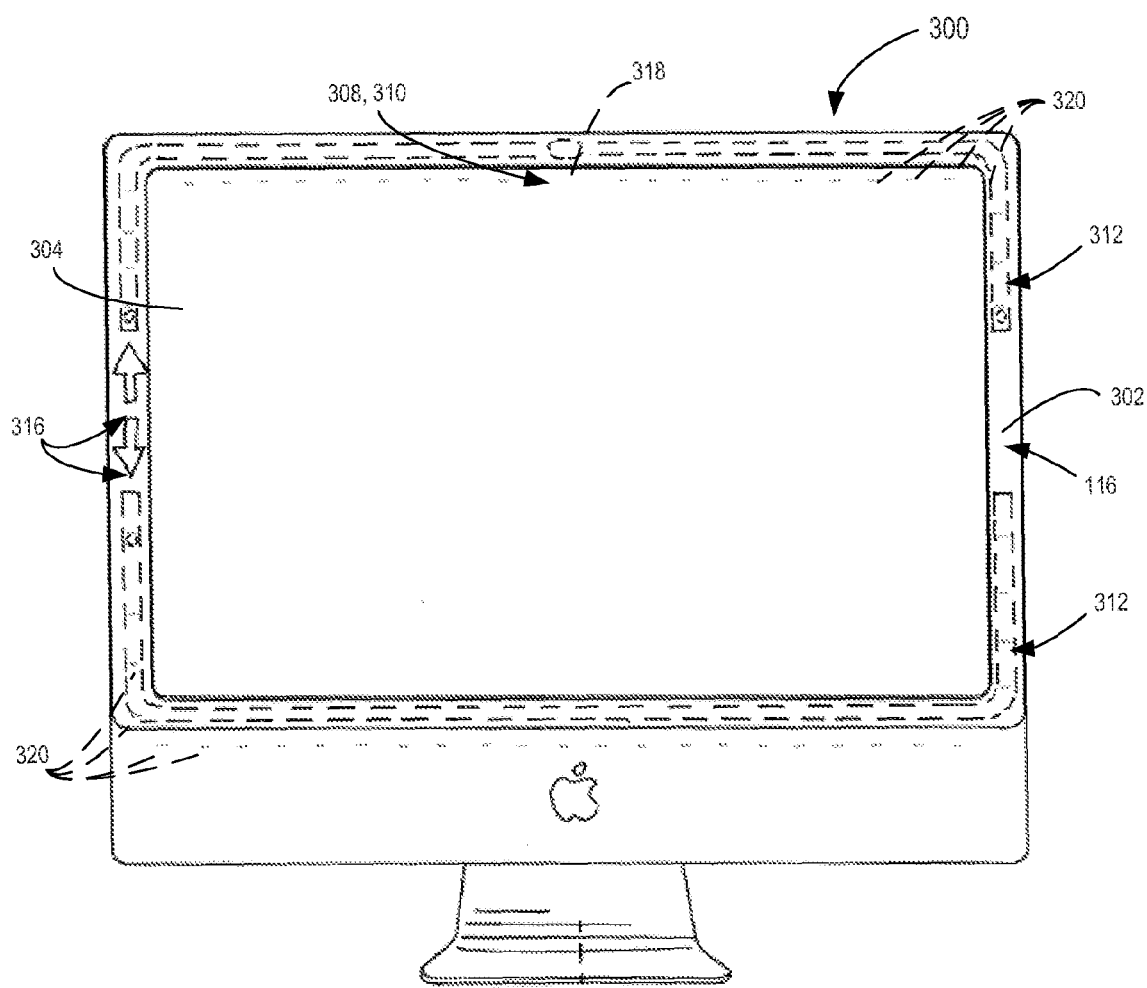
FIG. 3 depicts a further example embodiment of a device in the form of a computer monitor having masked optical components.

The provision of obscured visual sensors and indicators in a black setting or background, such as that provided by the arrangement described with reference to FIGS. 1-2, may be employed in a variety of applications. Thus, for example, FIG. 3 illustrates another example embodiment of a monitor 300 having a screen 304 surrounded by a border area or periphery 302 that is covered by a laminate 116 similar to that of FIG. 2. Like reference numerals indicate like parts in the respective drawings. Similar to the monitor 100 of FIGS. 1-2, the monitor 300 defines a recess 310 in an upper crossbar, with an ALS 112 mounted in the recess. A lens 318 for a video capturing device or video camera is additionally situated in the recess 310. To minimize degradation of images captured by the camera lens 318, the layers of the laminate 316 are optically flat. The layer of ink 220 of the laminate 116 defines a more or less rectangular recess 308 that is in alignment or in register with the ALS 112.

The monitor 300 additionally includes an elongated peripheral recess or channel 312 which extends along the periphery 302. A series of optical components is mounted in the recess 310. In this example the optical components include a series of light emitters in the form of LEDs 320. The LEDs 320 may serve to illuminate a face of a user seated in front of the monitor 300, thus to ensure proper lighting of the user's face, such as for photos or for videoconferencing. While, in some embodiments, the LEDs 320 may be white LEDs, the LEDs 320 may, in other embodiments, provide a red, green and blue (RGB) lighting arrangement, to permit variation in color characteristics of illuminating light provided by the LEDs 320. The LEDs 320 may thus, for example, be in communication with the ALS 112 by a control arrangement, to automatically adjust the color of illuminating light provided by the LEDs 320 dependent on the characteristics of ambient light, as sensed by the ALS 112. Alternatively, the color characteristics of illuminating light may be varied based on image analysis performed on images captured by the lens 318.

The monitor 300 further provides obscured indicia in the form of a pair of scroll arrows 316 located on a sidebar of the periphery 302. The arrows 316 are constructed in a manner similar to the arrangement described in FIGS. 1-2, comprising a pair of indicator lights housed in respective recesses which are aligned with associated apertures in the layer of black ink 220. The apertures of the arrows 316 are, however, shaped to provide respective indicia or icons, in this example being the respective arrows. Thus, in use, when a display on the screen 304 is being scrolled up or down, the corresponding arrow 316 will become visible due to automatic powering of its indicator light, but will otherwise be practically invisible to a user.

Figure 4:
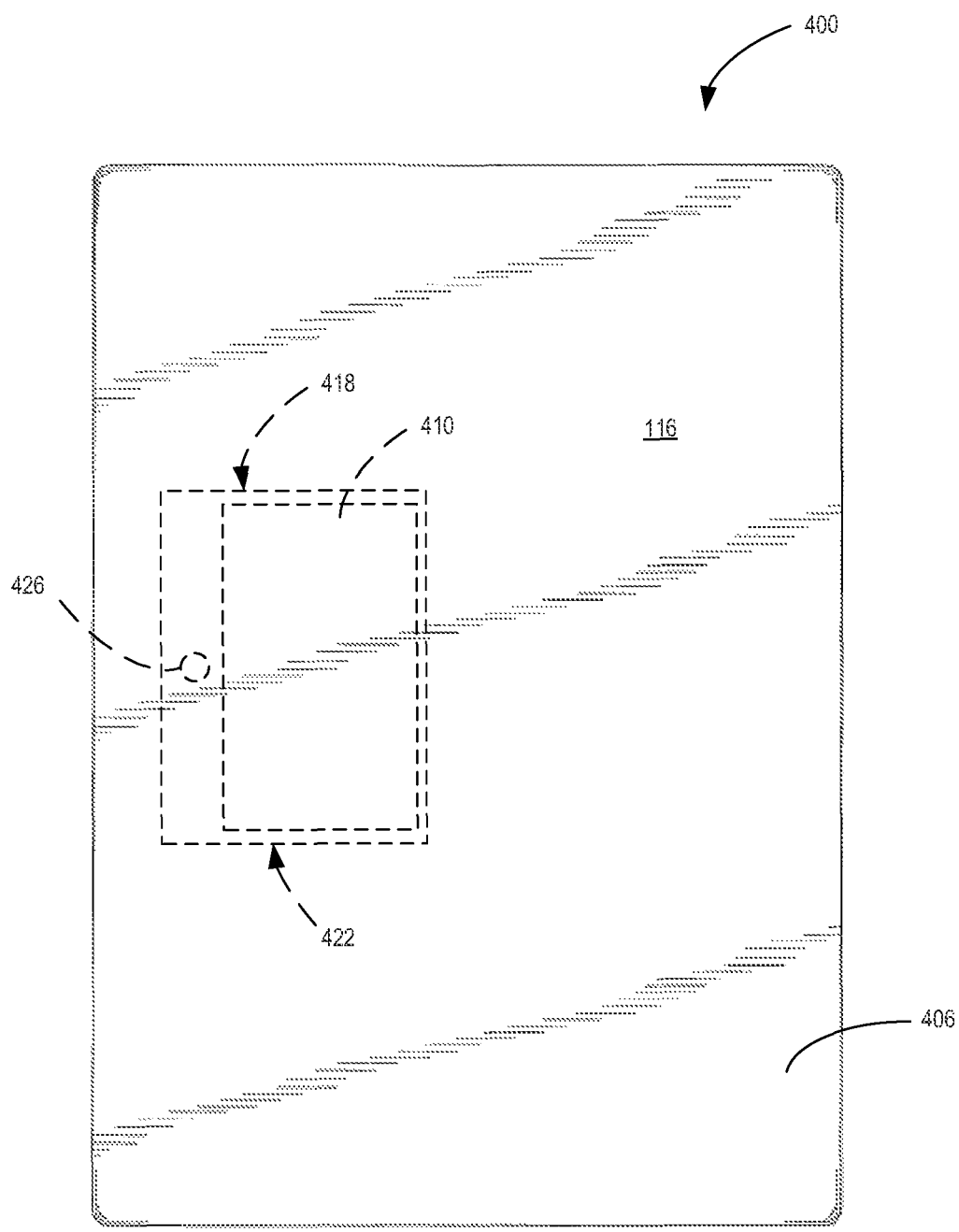
FIG. 4 depicts yet a further example embodiment of a device provided with masked optical component, the exemplary device being in the form of a laptop computer.

Yet a further example embodiment is illustrated in FIG. 4, in which reference numeral 400 generally indicates a laptop computer. In this example, the concealing structure is used on an external surface, completely independent of the laptop display. The computer 400 is of typical clamshell construction, comprising a base (not shown) and a lid 406 which are hingedly connected together for operation between an open condition in which a display screen on the inside of the lid 406 is visible, and a closed condition shown in FIG. 4. The computer 400 includes an auxiliary hidden display 410 on the outside surface of the lid 406 adjacent a rear edge of the computer 400. The display 410 comprises an array of colored LEDs mounted in a recess 418 in the lid 406, although, in other embodiments, an LCD or other type of display may be used. A laminate 116 similar to that described with reference to FIGS. 1-2 extends over the back surface of the lid 406, providing an operatively outer surface for the lid 406. In this embodiment, the laminate 116 extends continuously over the entire back of the lid 406, to provide a continuous flat surface for the lid 406. A frame member provided by a layer of black ink 220 in the laminate 116 defines a rectangular aperture 422 aligned with the display 410, to allow the passage of light through the laminate 116 when the display 410 is activated and emits light. A further optical component in the form of a passive infrared (PIR) proximity sensor 426 is mounted in the recess 418. The proximity sensor 426 is somewhat larger than, for example, the ALS 112 described with reference to FIG. 2. The proximity sensor 426 may have a diameter of 5-8 mm, while an ALS 112 may have a diameter of 2-4 mm.

The display 410 may be connected to the proximity sensor 426 to automatically activate the display 410 in response to sensing of the presence of an object such as a human hand. The presence of the recess 418 and its optical components are visually obscured when the display 410 is inactive, due to the trapping of light by operation of the linear polarizer 212 and the wave plate 216 forming part of the laminate 116, as described above. The aperture 422 will therefore emit no or little light and appear black, thus being indistinguishable from the black appearance of the lid 406 provided by the layer of black ink 220, so that the lid 406 of the computer 400 has an unbroken black appearance. However, when a user brings a hand close to lid 406, its presence is sensed by the proximity sensor 426 and the auxiliary display 410 is automatically activated. The display 410 may be arranged to display information a user may wish to access without opening and switching on the computer 400, such as, for example, information regarding a user's e-mail account, when the display 410 is implemented to indicate, for example, a number of unread e-mail messages.

Further applications of an optical mask arrangement as described above, may include an indicator mounted in a key of a keyboard, so that an upper surface of the key has an apparently unbroken black finish, but displays a backlit letter, indication, or icon when the indicator light is switched on. In a further use, an array or ensemble of proximity sensors, such as infrared proximity sensors, may be mounted at spaced positions on a periphery of a monitor or computer screen in order to, for example, detect human gestures. The proximity sensors may be masked by a laminate 116, so as to obscure the sensors and provide a clean black surface to be screened periphery.

The described masked optical indicators and sensors have been described in the context of devices such as desktop computers, laptop computers, mobile telephones, touchscreen tablets, and the like. However, as noted earlier herein, the methods and apparatus are equally applicable to a much broader arrange of electronic devices beyond the consumer electronics and computer fields. For example, the above-described methods and structures may also be used in automotive applications (for example to provide masked indicators on a vehicle dashboard), on medical devices (for example, as indicators of various types), and in a broad range of other device types and applications as will be apparent to persons having the benefit of the present disclosure.

The above-describe methodologies may also be employed using partial polarization. A linear polarizer forming part of the laminate may thus, for example, pass some light having a polarization different from the optical axis of the linear polarizer. This may be the case when a thinner layer of polarizer is used. Instead, or in addition, a thinner wave plate may be used (as in the previously mentioned possible use of a ⅛th wave plate instead of a quarter wave plate). An advantage of such partial polarization is greater transmission of light, with concomitant improved performance of indicators, sensors, illuminators, cameras, and the like. Although partial polarization may cause the hidden features to be somewhat more easily detectable, complete efficacy of the polarizer system may not be required to adequately hide some components. For example, smaller optical components may be effectively hidden from normal viewing, even if not all reflected light is blocked from transmission to the exterior of the electronic device.

Many additional modifications and variations may be made in the techniques and structures described and illustrated herein without departing from the spirit and the scope of the present invention. Accordingly, the present invention should be clearly understood to be limited only by the scope of the claims and equivalents thereof.

What is claimed is:

1. A housing for a computing device, the housing comprising:
    a border area;
    an optical component mounted in the border area; and
    a laminate component mounted on the border area, wherein the laminate component at least partially covers the optical component, wherein the laminate component comprises:
        a linear polarizer; and
        a wave plate positioned between the linear polarizer and the optical component, wherein the wave plate causes at least partial circular polarization of linearly polarized light.

2. The housing of claim 1, wherein the wave plate is positioned substantially parallel to the linear polarizer.

3. The housing of claim 1, wherein the linear polarizer is configured to cause linear polarization of light prior to the light passing to the optical component.

4. The housing of claim 1, further comprising a frame, wherein the frame defines an aperture in alignment with the optical component.

5. The housing of claim 4, wherein an outer surface of the frame has a black appearance.

6. The housing of claim 4, wherein the frame forms at least part of the laminate component.

7. The housing of claim 4, wherein the frame is a layer of ink.

8. The housing of claim 1, wherein the laminate component further comprises a clear cover plate, wherein the clear cover plate defines an outer surface of the laminate component.

9. The housing of claim 1, further comprising a blind recess, wherein the optical component is mounted in the blind recess and further wherein the laminate component extends at least partially across an opening associated with the blind recess.

10. The housing of claim 1, wherein the optical component is one or more of an optical sensor, an indicator light, and an illuminator.

11. A device comprising:
    at least one optical component located in a recess of a housing; and
    an laminar mask at least partially covering the recess of the housing, the laminar mask comprising:
        a linear polarizer;
        a wave plate positioned between the linear polarizer and the at least one optical component;
        a translucent cover plate; and
        a layer of high optical density fluid between the cover plate and the linear polarizer.

12. The device of claim 11, wherein the high optical density fluid has a refractive index greater than that of air.

13. The device of claim 11, wherein the high optical density fluid is an index matching fluid having a refractive index between a refractive index of the cover plate and a refractive index of the linear polarizer.

14. The device of claim 11, further comprising a frame component defining an aperture, wherein the frame component comprises an outer surface having a dark appearance around the aperture.

15. The device of claim 14, wherein the frame component comprises a layer of dark ink between the translucent cover plate and the layer of high optical density fluid.

16. A method comprising:
    mounting a laminate component on a selected region of an electronic device, the laminate component comprising:
        a linear polarizer;
        a wave plate mounted substantially parallel to the linear polarizer and positioned between the linear polarizer and at least one optical component; and
        a layer of high optical density fluid between the cover plate and the linear polarizer.

17. The method of claim 16, further comprising mounting a frame component on the electronic device such that an aperture defined by the frame component aligns with the optical component, wherein the frame component comprises an outer surface having a dark appearance for a portion of the outer surface that surrounds the aperture.

18. The method of claim 17, wherein the frame component forms part of the laminate component.

19. The method of claim 16, wherein the laminate component further comprises a cover plate that defines an outer surface of the laminate component.

20. The method of claim 16, wherein the at least one optical component comprises one or more of an optical sensor, an indicator light, and an illuminator.

* * * * *